United States Patent Office 3,384,652
Patented May 21, 1968

3,384,652
METHOD OF REACTING SUBSTITUTED SILANES EMPLOYING ALUMINOSILICATE CATALYST
Lyle A. Hamilton, Pitman, N.J., assignor to Mobil Oil Corporation, a corporation of New York
No Drawing. Filed June 8, 1964, Ser. No. 373,550
8 Claims. (Cl. 260—448.2)

ABSTRACT OF THE DISCLOSURE

Organo and/or chloro substituted silanes undergo disproportionation reactions or condensation reactions in the presence of crystalline aluminosilicate catalyst. A typical reaction is the disproportionation of dimethyldichlorosilane to principally methyltrichlorosilane and trimethylchlorosilane.

---

The present invention generally relates to methods for the production of halosilanes and organic substituted halosilanes. More specifically, the invention is concerned with the production of such compounds by catalyzed disproportionation and condensation reactions.

Silanes or silicon hydrides are compounds of silicon and hydrogen. The more common silicon hydrides are silane ($SiH_4$), disilane ($Si_2H_6$), trisilane ($Si_3H_8$) and tetrasilane ($Si_4H_{10}$). The penta- and hexasilanes are also known, but tend to decompose into lower silanes and silicon at relatively low temperatures.

One or more of the hydrogen atoms of the basic silane compounds may be substituted or replaced by other atoms or radicals. Where the substitution is solely by halogen atoms, the resulting compounds are known as halosilanes. Compounds resulting from complete or partial replacement of hydrogen atoms by both halogen atoms and organic radicals are referred to as organic substituted halosilanes. An important series of compounds known as chlorosilanes is formed where the replacing halogen atom is chlorine. Indeed, the available commercial intermediates are more frequently alkyl or aryl chlorosilanes characterized by an absence for the most part of Si—H bonds.

Some of the halosilanes and organic substituted halosilanes are relatively abundant or are easily synthesized. Others are relatively difficult to produce. Fortunately, many of the less readily produced compounds can be prepared conveniently by disproportionation or condensation reactions utilizing the more available compounds as starting materials.

However, the disproportionation and condensation reactions involving chlorosilanes and organic substituted silanes do not take place at a sufficiently high rate of speed or with a high enough product yield to provide a satisfactory source of these compounds, unless a catalyst is present.

Therefore, it is an object of the present invention to provide a new highly efficient method for producing chlorosilanes and organic substituted chlorosilanes by improved disproportionation and condensation reactions.

In general, the present invention comprises the production of chlorosilanes and organic substituted chlorosilanes by conducting disproportionation reactions and condensation reactions in the presence of crystalline aluminosilicate catalysts.

The disproportionation reactions of the type contemplated in the present invention are illustrated in the following equations:

(1) $2R_2SiX_2 \rightleftharpoons RSiX_3 + R_3SiX$
(2) $2RSiX_3 \rightleftharpoons SiX_4 + R_2SiX_2$
(3) $2R_3SiX \rightleftharpoons R_2SiX_2 + R_4Si$
(4) $2X_3SiH \rightleftharpoons X_2SiH_2 + SiX_4$
(5) $2SiX_4 + 3R_4Si \rightleftharpoons RSiX_3 + R_2SiX_2 + 3R_3SiX$
(6) $(Alkyl)_4Si + (aryl)_4Si \rightleftharpoons$ mixed alkyl, aryl silanes Since the products of any one disproportionation reaction can undergo similar disproportionation, any single pure chlorosilane can be converted to a mixture of all of the possible products.

The condensation reactions are illustrated by the following general equations:

(7) $R_3SiH + XSiR_3 \rightarrow R_3SiSiR_3 + HX$
(8) $R_3SiH + XR \rightarrow R_3SiR + HX$ In the above equations R is lower alkyl e.g. methyl, ethyl or propyl, or phenyl, and X is chlorine.

Disproportionation reactions (1) through (3) may be further characterized by the equation:

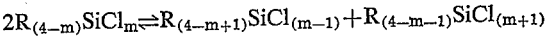

where R is lower alkyl or phenyl, or any combination thereof, and m is greater than or equal to 1 and less than 4.

Condensation reactions 7 and 8 can be represented by the equation:

$$R_3SiH + YCl \rightarrow R_3SiY + HCl$$

where R has the meaning given above, and Y is a lower alkyl radical or a trisubstituted silicon radical having the formula —$SiR_3$ where R has the above defined meaning.

The reactions described above can be promoted by the catalysts employed in the method of this invention.

The disproportionation reactions of this invention are accomplished by contacting a silane, as described in reactions 1 through 6 above, with a crystalline aluminosilicate. The disproportionation reactions can be conducted at temperatures ranging from 0° C. to 250° C., preferably, however, in the range from 50° to 200° C. It is interesting to note that a similar reaction employing $AlCl_3$ catalyst is carried out at temperatures of 70° C.

In some instances, a solvent such as hexane is employed to provide a liquid phase for conducting the reaction. The solvent also has a diluting effect.

The reaction lends itself to either continuous or batch operations. When employing a continuous process, the silane is passed over a pelletized catalyst at a LHSV of 0.2–20, depending on the activity of the catalyst. The disproportionation by-products are collected in a cold trap and separated by fractionation. In batch operations, the silane is reacted in the presence of 1 to 5% by weight of catalyst and stirred and heated from 50–200° C. from 6 to 10 hours. Again, the use of a solvent is optional.

The catalysts employed according to this invention are crystalline aluminosilicate materials sometimes referred to in the art as zeolites. The preferred crystalline aluminosilicate materials comprise those zeolites having a high proportion of hydrogen sites or acid sites, such as Rare Earth Hydrogen Zeolite X, Hydrogen Zeolite Y and hydrogen mordenite.

The conditions employed for the condensation reactions are generally the same as those for the disproportionation method and generally the same type and preferred catalysts are used as described above.

The following examples illustrate some preferred embodiments of the invention and are not intended to be construed as limiting the broad concept thereof.

Example 1.—Disproportionation of tetraethyl silicon with tetrapropyl silicon

A mixture of 0.1 mole of tetraethyl silicon and 0.1 mole of tetrapropyl silicon is stirred with 2 grams of Rare Earth Zeolite X at 150° C. for 6 hours. The crude product is filtered to remove catalyst, and analyzed by vapor phase chromatography. An analysis shows the reaction product to consist of 5% unreacted $(C_2H_5)_4Si$, 21% $(C_2H_5)_3(C_3H_7)Si$, 40% $(C_2H_5)_2(C_3H_7)_2Si$, 24% $C_2H_5(C_3H_7)_3Si$ and 10% $(C_3H_7)_4Si$.

Example 2.—Disproportionation of dimethyldichlorosilane

One mole of dimethyldichlorosilane is heated under reflux for 12 hours with 5 grams of powdered hydrogen Zeolite Y. After filtering the reaction product to remove the catalyst, the product is fractionally distilled to yield 25% $ClSi(CH_3)_3$, 5% $SiCl_4$, 8% $Si(CH_3)_4$, 40% unreacted $Cl_2Si(CH_3)_2$ and 22% $Cl_3SiCH_3$.

Example 3.—Disproportionation of tetraphenyl silicon with tetrapropyl silicon

The method of Example 1 was repeated, however, tetraphenyl silicon was used in place of tetraethyl silicon. The products of the reaction comprise unreacted

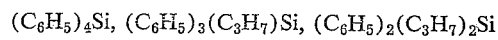

$C_6H_5(C_3H_7)_3Si$ and $(C_3H_7)_4Si$ in substantially the same ratios as in Example 1.

Example 4.—Disproportionation of diphenyldichlorosilane

The method of Example 2 was repeated using diphenyldichlorosilane. The products of the reaction comprise $Cl(Si)(C_6H_5)_3$, $SiCl_4$, $Si(C_6H_5)_4$, unreacted $Cl_2Si(C_6H_5)_2$, $Cl_3SiC_6H_5$ in substantially the same ratios as those obtained in Example 2.

Results similar to those obtained in Examples 2 and 4 are realized when chlorotrimethylsilane, methyl trichorosilane, chlorotriphenylsilane and phenyltrichlorosilane are employed as the reactants.

Example 5.—Continuous disproportionation of tetraethyl silicon with tetrapropyl silicon The reactants are combined in a continuous process at an LHSV of ~2 and a temperature of 150° C. Rare Earth Zeolite X is employed as the catalyst. The liquid reactants are passed over the heated catalyst and the products collected in a cooled receiver. The results are substantially the same as those obtained in Example 1.

Example 6.—Continuous disproportionation of dimethyldichlorosilane

The reactant is contacted with a hydrogen Zeolite Y catalyst under the same conditions as given in Example 5. The results are substantially the same as those obtained in Example 2.

The catalysts employed in the present invention are crystalline metal aluminosilicates. Included within the scope of the term "crystalline metal aluminosilicates" are natural and synthetic molecular sieves and crystalline zeolites.

Crystalline metal aluminosilicates have the following general formula, in terms of oxides:

$$M_{2/n}O \cdot Al_2O_3 \cdot YSiO_2 \cdot ZH_2O$$

in the salt form, wherein $n$ is the valence of the metal cation M, Y is the number of moles of silica and $ZH_2O$ is the water of hydration.

Crystalline aluminosilicates of the above structure may be activated by removal of the water of hydration and when so activated, they possess sites capable of promoting catalytic conversions. Upon dehydration, the aluminosilicates are found to be highly porous and possess numerous surface cavities and internal pores connecting the cavities. These pores are of substantially constant diameter, generally in the range of from 3 to 13 A., the exact size depending upon the composition and structure of the specific aluminosilicate.

In order to modify the properties of such materials, the original cations of the aluminosilicates, usually sodium, potassium, and/or calcium may also be changed by processes of ion-exchange.

Suitable crystalline aluminosilicates for use in the production of the catalysts of the present invention include both natural and synthetic crystalline aluminosilicates.

A fairly wide variety of natural crystalline zeolites exist and, among these, faujasite has been found to be an especially useful material for the preparation of catalysts. Other satisfactory natural crystalline zeolites include, for example, analcite, paulingite, ptilolite, clinoptilolite, ferrite, chabazite, gmelinite, levynite, erionite and mordenite.

Among the most suitable synthetic crystalline aluminosilicates are the synthetic faujasites, including both X and Y types which have a crystal structure coresponding to that of natural faujasite. The preparation of such X aluminosilicates is described in U.S. Patent 2,882,244, Milton, issued Apr. 14, 1959. The preparation of the Y type is described in Belgian Patent 577,642.

Another important synthetic crystalline zeolite not having a corresponding natural form is Zeolite A. The preparation of this crystalline aluminosilicate is described in U.S. Patents 2,882,243 to Milton and 2,982,612 to Barrer et al.

Other suitable synthetic crystalline zeolites useful in the present invention include, for example: Y zeolite, B zeolite, E zeolite, F zeolite, G zeolite, H zeolite, K-G zeolite, J zeolite, L zeolite, M zeolite, K-M zeolite, Q zeolite, R zeolite, S zeolite, T zeolite, U zeolite, Z zeolite and others.

Highly useful crystalline aluminosilicate catalysts may be prepared by subjecting sodium X molecular sieve to ion-exchange with a solution of rare earth chlorides until the sodium content is reduced to about 1.0–1.5% by weight of sodium and until about 25% by weight of rare earth ions calculated as $RE_2O_3$ is introduced.

The various forms of synthetic crystalline aluminosilicate are also sometimes identified by numerical prefixes, as for example 4A-, 5A- and 13X-zeolite. The 4A and 5A materials are zeolites of crystalline structure A and have a pore size of about 4 A. and 5 A. diameter respectively. A 13X material is one having an X crystalline structure and a pore size of about 10 A. diameter.

The aluminosilicate materials may also be converted to the H or acid form in which hydrogen ions occupy the cation sites. For example, such a conversion may be had by ion-exchange with an ammonium ion followed by heating to drive off $NH_3$ or by controlled acid leaching with a hydrochloric acid solution or like reagent. In general, the H form is more stable in materials having $SiO_2/Al_2O_3$ of 3.5 or higher. Useful catalysts are also produced by a combination of ion-exchange treatments. For example, the crystalline aluminosilicates may be converted to the H or acid form by acid leaching and then may be ion-exchanged with a solution of rare earth salts to produce catalysts, such as rare earth hydrogen exchanged mordenite, rare earth hydrogen exchanged synthetic faujasite of X or Y type and many other useful ion-exchanged catalysts. It will also be apparent that more than one type of metal cation may be used to ion-exchange the crystalline aluminosilicates and that the sequence of ion-exchange treatments may be varied. For example, acid leaching to substitute hydrogen ions may precede or follow ion-exchange treatment to substitute metal cations.

The crystalline metal aluminosilicate catalysts may be used in any convenient physical form, e.g., finely divided particles in dense or fluidized beds and beads or pellets in fixed or moving beds.

The present catalysts may also be used in combination with other materials which may or may not have catalytic activity of their own.

The preferred crystalline aluminosilicates comprises zeolites with a high proportion of hydrogen sites or acid sites, for example, rare earth hydrogen Zeolite X, hydrogen Zeolite Y and hydrogen mordenite.

The particles of the crystalline metal aluminosilicate catalyst may be mixed with particles of a clay, gel, refractory oxide, siliceous material or the like.

The catalyst may also be composited with a matrix material to form discrete agglomerates containing both the catalyst component and the matrix component. A convenient method for producing such composites comprises dispersing particles of the molecular sieve catalyst in a gel-forming solution and then precipitating the gel to entrap the catalyst. Various gels and co-gels, such as silica gel or silica-alumina co-gel, may be used for this purpose.

Although the invention has been described with reference to certain preferred embodiments, it is intended that the broad scope is not to be limited thereby and certain variations may be made without departing from the true scope embodied in the following claims.

What is claimed is:

1. A method comprising disproportionating a member selected from the group consisting of $RSiSl_3$, $R_2SiCl_2$, $R_3SiCl$, and a chlorosubstituted silane containing at least one hydrogen atom, where R is selected from the group consisting of lower alkyl and phenyl, in the presence of a crystalline metal aluminosilicate catalyst.

2. A method according to claim 1, wherein the disproportionation is carried out at a temperature of about 0° C. to 250° C.

3. A method comprising disproportionating organic substituted chlorosilanes according to the reaction equation $$2R_{(4-m)}SiCl_m \rightleftharpoons R_{(4-m+1)}SiCl_{(m-1)} + R_{(4-m-1)}SiCl_{(m+1)}$$

where each R is selected from the group consisting of lower alkyl and phenyl, and $m \geq 1$, and less than 4, in the presence of a crystalline metal aluminosilicate catalyst at a temperature of about 0° C. to 250° C.

4. A method comprising reacting an organosilane wherein the organic substituents are selected from the group consisting of lower alkyl and phenyl with silicon tetrachloride in the presence of a crystalline metal aluminosilicate catalyst at a temperature of about 0° C. to 250° C.

5. A process comprising reacting a first organic tetrasubstituted silane with a second organic tetrasubstituted silane of different chemical composition, in which the organic substituents of the first and second silanes are different and are each selected from the group consisting of lower alkyl and phenyl, in the presence of a crystalline aluminosilicate catalyst at a temperature of about 0° C. to 250° C.

6. A method for producing trimethyl chlorosilane comprising contacting dimethyl dichlorosilane with a crystalline metal aluminosilicate catalyst at a temperature in the range of from 0° C. to 250° C.

7. A method for producing triphenyl chlorosilane comprising contacting diphenyl dichlorosilane with a crystalline metal aluminosilicate catalyst at a temperature in the range of from 0° to 250° C.

8. A method for producing chlorodisilanes comprising contacting a mixture of a trichlorosilane and silicon tetrachloride with a crystalline metal aluminosilicate at a temperature of from 0° to 250° C.

References Cited

UNITED STATES PATENTS

| | | | |
|---|---|---|---|
| 3,322,511 | 5/1967 | Weyenberg | 260—448.2 XR |
| 3,346,349 | 10/1967 | Harding et al. | 260—448.2 XR |
| 2,717,257 | 9/1955 | Bluestein | 260—448.2 |
| 2,786,861 | 3/1957 | McEntee | 260—448.2 |
| 2,887,500 | 5/1959 | McEntee | 260—448.2 |
| 3,004,053 | 10/1961 | Shiihara et al. | 260—448.2 |

TOBIAS E. LEVOW, *Primary Examiner.*

P. F. SHAVER, *Assistant Examiner.*

UNITED STATES PATENT OFFICE
CERTIFICATE OF CORRECTION

Patent No. 3,384,652                              May 21, 1968

Lyle A. Hamilton

It is certified that error appears in the above identified patent and that said Letters Patent are hereby corrected as shown below:

Column 5, line 16, "$RSiSl_3$" should read -- $RSiCl_3$ --.

Signed and sealed this 14th day of October 1969.

(SEAL)
Attest:

Edward M. Fletcher, Jr.                        WILLIAM E. SCHUYLER, JR.
Attesting Officer                                    Commissioner of Patents